(12) United States Patent
Dewis

(10) Patent No.: US 6,966,173 B2
(45) Date of Patent: Nov. 22, 2005

(54) HEAT TRANSFER APPARATUS

(75) Inventor: David W. Dewis, Stuart, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 208 days.

(21) Appl. No.: 10/288,701

(22) Filed: Nov. 6, 2002

(65) Prior Publication Data
US 2004/0083712 A1 May 6, 2004

(51) Int. Cl.[7] .............................................. F02C 7/10
(52) U.S. Cl. .................... 60/39.511; 165/9.3; 165/9.4
(58) Field of Search ......................... 60/39.511; 165/4, 165/9.3–9.4

(56) References Cited

U.S. PATENT DOCUMENTS

| | | | | |
|---|---|---|---|---|
| 2,650,073 A | * | 8/1953 | Holm ....................... | 60/39.511 |
| 3,320,749 A | * | 5/1967 | Castle et al. ............... | 60/39.511 |
| 5,105,617 A | * | 4/1992 | Malohn ..................... | 60/39.511 |
| 2002/0079085 A1 | * | 6/2002 | Rentz ......................... | 165/54 |
| 2002/0124569 A1 | * | 9/2002 | Treece et al. ............ | 60/39.511 |
| 2003/0024696 A1 | * | 2/2003 | Haplau-Colan et al. ..... | 165/153 |

* cited by examiner

Primary Examiner—Louis J. Casaregola
(74) Attorney, Agent, or Firm—Norman Friedland

(57) ABSTRACT

The annular recuperator for use with a microturbine includes an involuted shaped inner member with a portion thereof being corrugated and an involuted shaped outer member also with a portion thereof being corrugated and spaced therefrom to define a cell. The end portions of both the inner and outer members is planar and define a header for admitting and discharging the fluid flowing in the cell. The edges of the inner and outer members are sealed and an inlet and outlet are fluidly connected to the respective headers. The cells are circumferentially mounted side by side and abut each other but leaving sufficient space for another medium to flow through the space and be place in indirect heat exchange with the fluid flowing in the cell. The cells when mounted define an annular configuration so that compressor discharge air from the compressor of the microturbine flows through the cells and turbine discharge engine working fluid flows between the cells for preheating the compressor discharge air prior to being admitted into the combustor. The recuperator has utility as a heat exchanger for other applications.

10 Claims, 2 Drawing Sheets

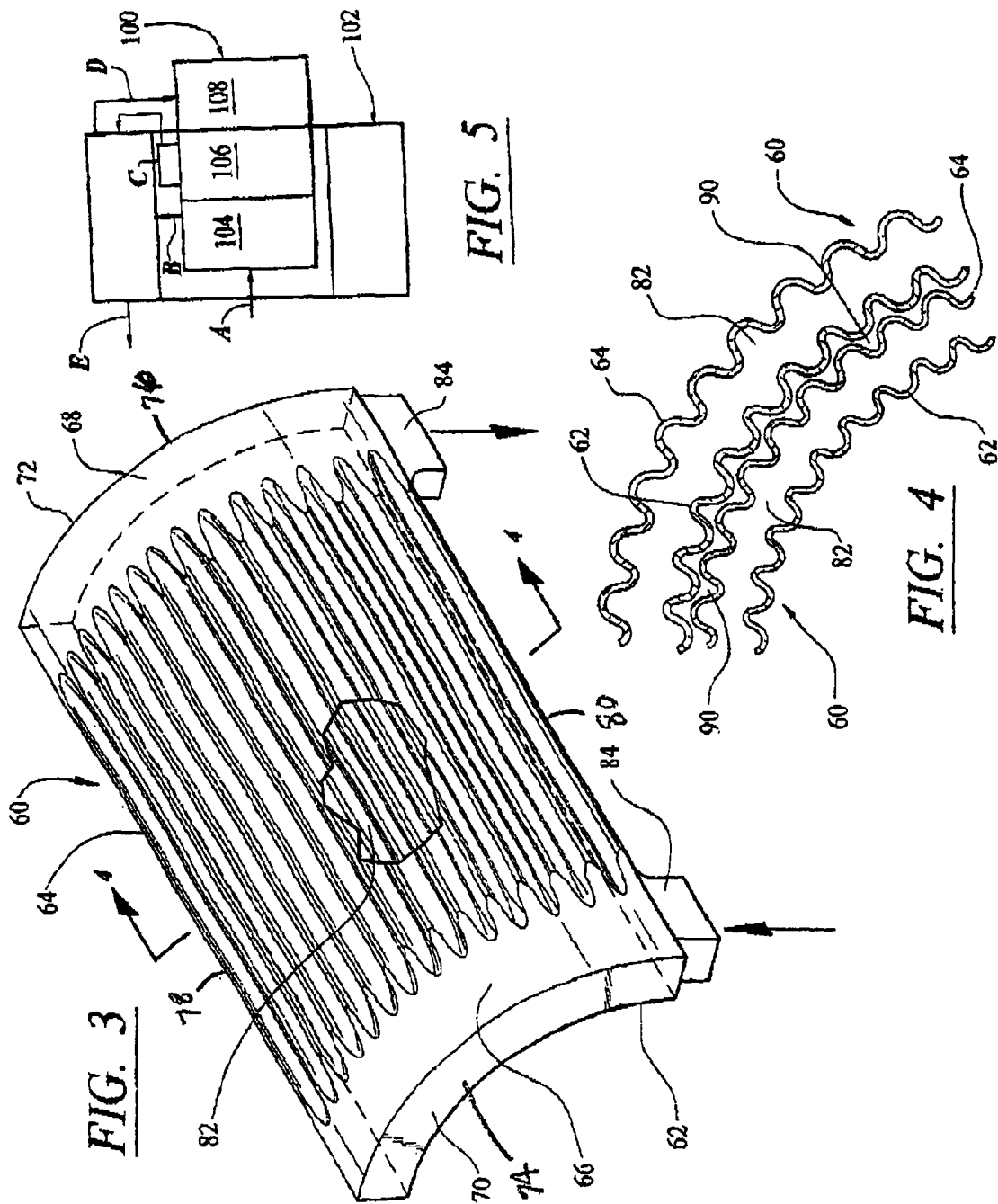

6,966,173 B2

HEAT TRANSFER APPARATUS

TECHNICAL FIELD

This invention relates to heat exchangers and more particularly to heat exchangers that are adapted for use in an annular recuperator for a microturbine.

BACKGROUND OF THE INVENTION

This invention constitutes an improvement over the recuperator structure described and claimed in co-pending patent application Ser. No. 09/934,640 filed on Aug. 22, 2001 by William R. Ryan entitled "Recuperator For Use With Turbine/Turbo-alternator", published and commonly assigned to the same assignee of this patent application and incorporated herein by reference. While the structure disclosed in the aforementioned patent application describes an annular recuperator for an annular combustor, the invention is essentially a heat exchanger that can be configured in other configurations such as annular, square, rectangular, etc.

Scientist and engineers have spent a great deal of time and effort for improving heat exchangers and particularly those used with microturbines. As one skilled in this art appreciates, the recuperator for the microturbine is one of the most expensive components of the system and it typically is constructed from relatively thin sheet metal with a portion thereof being preformed into corrugated sheets or fins. The fins and sheet metal sub-assemblies are typically brazed. In the microturbine environment the recuperator serves to preheat the compressor discharge air entering the combustor by being placed in indirect heat exchange relation to the turbine exhaust. Because the recuperator operates in a hostile environment, namely the relatively high pressure air discharging from the engine's compressor and the relatively hot exhaust (1000 degrees Fahrenheit (° F.)) discharging from the turbine, the manufacturing of the recuperator is complex and difficult and requires considerable effort to assure its long life.

The recuperator described in the aforementioned patent application is an annular recuperator consisting of a plurality of involute shaped cells circumferentially spaced between a plenum divided into a cold and a hot chamber and an outer adjustable shroud. Each cell is sealed and includes an inlet header and inlet and an outlet header and outlet axially spaced relative to each other. The spaces between cells essentially define straight-through passages and a plurality of fins are mounted in these spaces between the cells and since the fins are flexible they conform to the involute shape. (The outer configuration of this assembly resembles the shape of a stator vane typically used in gas turbine engines). In operation, the compressor discharge air flows into the plenum and is directed into the cells via the inlet in the inlet header of the cell and is discharged into the hot chamber through a discharge port associated with the discharge header. The space between the cells provides a straight-through passage flowing the turbine exhaust placing the exhaust in indirect heat exchange with the cooler air in the cells. The heat picked up by the compressor discharge air by conduction is transported to the inlet of the combustor where it is combusted with fuel and delivered to the turbine at a temperature approximating 1500° F.

While the purpose of the structure disclosed in the aforementioned patent application is to reduce leakage and costs and, in fact, compared to heretofore known structures, it meets these objectives, this invention is intended to reduce the possibility of leaks and costs even above those obtainable by the recuperator described in the aforementioned patent application and the prior art. This invention eliminates the use of fins both in the cells and the spaces between cells without degrading heat exchange efficiency and improving heat exchange efficiency. This, alone, will reduce the number of locations necessary for brazing and the number of component parts, which, of course, contributes to the reduction of the costs both in parts and labor.

SUMMARY OF THE INVENTION

An object of this invention is to provide an improved heat exchanger that places two mediums in indirect heat exchange relationship.

A feature of this invention is the provision of sealed cells having an involuted sinusoidally shaped outer wall and a spaced involuted sinusoidally shaped outer wall contiguous with the inner wall and having opposite side edges sealed for transporting a medium from a source through an inlet in the inlet header formed in the cell through the cell and discharging the medium after heat exchange through a discharge header and a discharge port. The cells are circumferentially spaced defining straight through passages there between for flowing the other medium that is placed in indirect heat exchange with the first medium. The sealed cell and the spaces between cells do not include fins.

Another object of this invention is to provide a recuperator for a mircroturbine that is characterized as having fewer component parts than heretofore known recuperators and is less complicated to construct and is less expensive.

The foregoing and other features of the present invention will become more apparent from the following description and accompanying drawings.

BRIEF DESCRIPTION OF THE DRAWINGS

FIG. 3 is a view in perspective and elevation of a cell of a heate exchanger illustrating the present invention;

FIG. 4 is a sectional view taken along lines 4—4 of FIG. 3; and

FIG. 5 is a schematic illustration of a microturbine and recuperator capable of utilizing this invention.

Figures 1, 2:
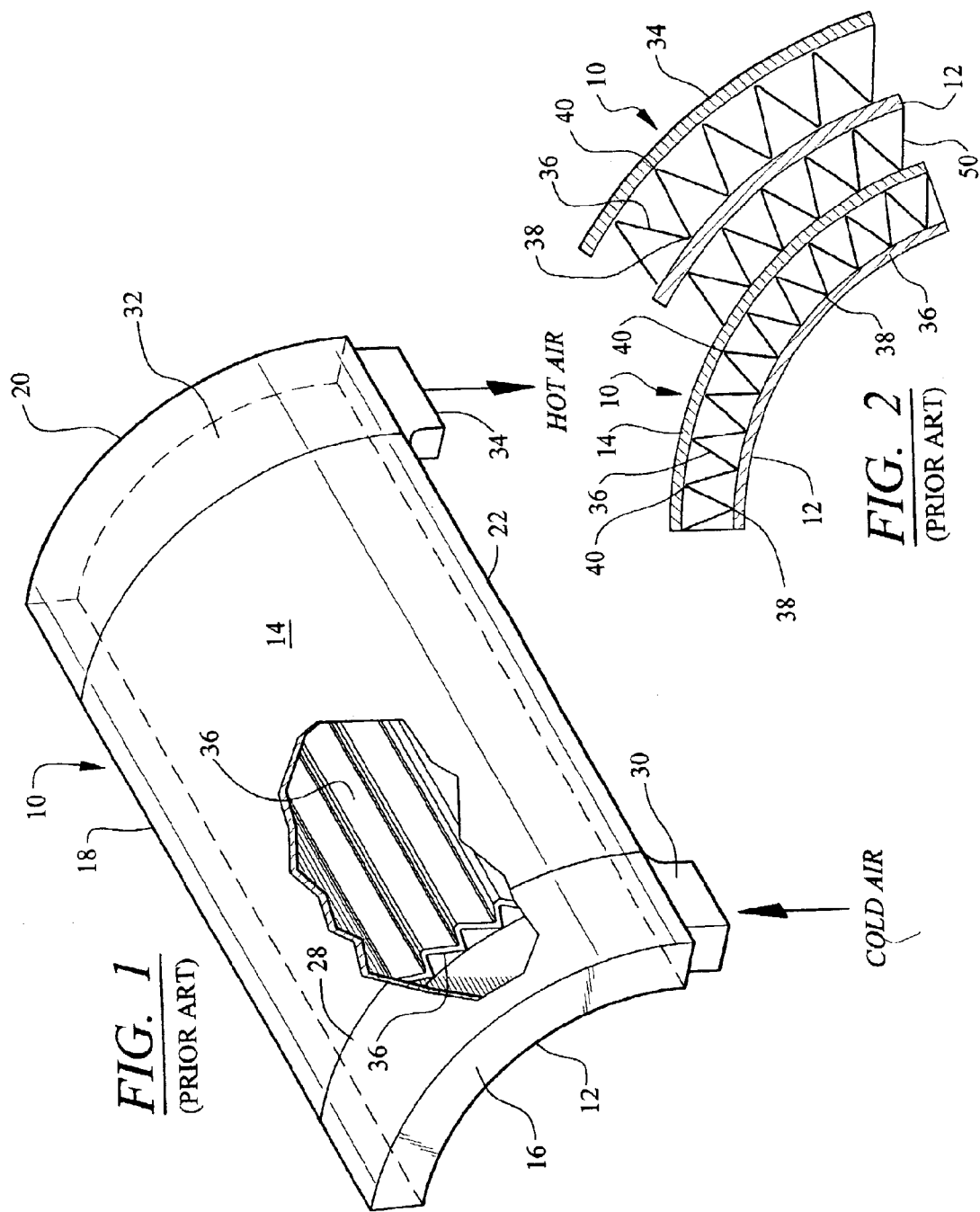
FIG. 1 is a view in perspective and elevation with a partial cut-away portion showing the details of a prior art cell configuration for an annular recupertator.
FIG. 2 is a partial view in schematic and section illustrating the arrangement of the cells and the fins mounted in the spaces between cells of the prior art configuration depicted in FIG. 1.

These figures merely serve to further clarify and illustrate the present invention and are not intended to limit the scope thereof

DETAILED DESCRIPTION OF THE INVENTION

While the preferred embodiment is intended for use in the recuperator of a microturbine, as one skilled in this art will appreciate, the invention can be employed for other applications where it is necessary to transfer heat from one medium to another medium by indirect heat relation.

Reference is now made to FIGS. 1 and 2 disclosing a portion of the prior art recuperator or cell generally indicated by reference numeral 10 that is of the type that is disclosed in the aforementioned patent application and for further details thereof reference should be made thereto. Cell 10 comprises a fore wall 12 that is essentially a planar member shaped in a rectangle and being bent to define an involute shape. A contiguous aft wall 14 being parallel spaced therefrom with all the four edges of the fore wall 12 and aft wall 14 being bent or swaged at the edges 16, 18, 20 and 22 and suitably sealed to define a sealed hollow chamber 24. The space 26 at the left hand side of chamber 24 defines an inlet header 28 having an inlet port 30 projecting from the edge 22. The end opposite the inlet header defines an outlet header 32 having an outlet port 34 also projecting from edge 22. Corrugated fin 36 having a top apex 38 and a bottom apex 40 that abuts against the inner surfaces of the fore wall 12 and the aft wall 14 defining a plurality of passages or open ended channels extending between the inlet header 28 and outlet header 32. Inlet port 30 and outlet port 32 fit into complementary ports formed in a plenum (not shown) having two (2) chambers (hot and cold).

The high pressure relatively cold air discharging from the compressor of the microturbine (not shown) is admitted into the cold chamber of the plenum and flows into the cell 10 via the inlet port 30 and inlet header 28 and then, through the channels and discharged through the outlet port 34 via the outlet header 32. The now heated compressor discharged air is returned to the engine to be admitted into the combustor (not shown) where it is fired and fed to the turbine for providing the engine's power. While the microturbine is typically utilized for powering an electrical generator, such devices has utility for other embodiments. For more details of a microturbine reference is hereby made to U.S. Pat. No. 6,314,717 granted to Teets et al on Nov. 13, 2001 entitled "Electricity Generating System Having An Annular Combustor" commonly assigned to the assignee of this patent application and microturbines manufactured by Elliott Energy Systems, Inc. and particularly of the types exemplified by Model Number TA-80, both of which are incorporated herein by reference.

FIG. 2 illustrates the complexity of the prior art recuperator as having a pair circumferentially spaced cells 10, each of which include the corrugated fin 36 sandwiched between the fore plate 12 and aft plate 16, and another fin 50 mounted in the space between cells 10.

In accordance with this invention and now referring to FIGS. 3 and 4, the cell 60 whose overall outer shape is similar to the cell 10 depicted in FIG. 1, is comprised of the fore generally rectangularly shaped partially corrugated plate 62 and the contiguous parallel spaced aft plate 64. A portion adjacent to the left and right ends 70 and 72 of the fore plate 62 and 64, respectively, are planar shaped and define the inlet header 66 and outlet header 68. All the side edges, 74, 76, 78 and 80 are sealed defining a sealed chamber 82. The involuted shaped cells 60 when assembled between an outer shroud (not shown) and the inner plenum (not shown) define the annular recuperator. And similar to the recuperator depicted in FIG. 1, the high pressure, relatively cool compressor discharge air is fed into the cells 60 vis its inlet 84 in fluid communication with inlet header 66, flows through the sealed chamber 82 and is collected in the discharge header 68 and leaves the cell 60 via the discharge port 60. It will be appreciated from the foregoing and in accordance with this invention the corrugated fore plate 62 and corrugated aft plate 64 provide a single thickness between the compressor discharge air and the exhaust enhancing heat transfer and hence, resulting in a higher heat transfer efficiency. Obviously, the core, i.e. the assembled involuted cells, where the exhaust passes between the corrugation of the cells is fabricated without the addition of fins. As best seen in FIG. 4, the cells 60 (two of which are illustrated schematically) are circumferentially mounted side by side and each cell abuts against each adjacent cell. The space 90 between cells 60, 60 defines a straight through passage to permit the exhaust from the turbine to pass therein and be placed in indirect heat exchange with the medium within the cell. The operation of the recuperator is similar to that disclosed in the aforementioned patent application and for further details reference should be made thereto.

To better understand the operation of the cells when utilized in a recuperator for a microturbine engine reference should be made to FIG. 5 which schematically illustrates the microturbine engine 100 and the annular recuperator 102. For details of these devices reference should be made to the microturbines commercially available from the assignee of this patent application which are incorporated herein by reference. Suffice it to say that the microturbine engine includes a compressor 104 for compressing the air admitted thereto through the inlet depicted by arrow A, which air is then routed to the annular recuperator 102 via the passage schematically indicated by arrow B and admitted into the cells of this invention where it is placed in indirect heat exchange with the turbine discharge fluid medium discharging from the turbine 106 via the passage schematically indicated by arrow C. The air discharging from each of the cells which is now at a higher temperature due to the heat transfer from the higher temperature turbine fluid medium, is redirected via the passage schematically indicated by arrow D into the combustor 108 where it is combusted with liquid or gaseous fuel to generate engine working medium and is delivered to the turbine and owing to the adiabatic expansion of the working medium powers the turbine. The spent engine working medium is discharged from the recuperator 102 via discharge indicated by arrow E. Obviously, in the microturbine application the power generated by the microturbine engine can be utilized to generate electricity, power pumps, power air conditioners, and the like.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A heat exchanger for a recuperator of a microturbine engine comprising a cell including a first an upper wall defining a primary heat exchange surface and a second lower wall underlying and contiguous to said first upper wall defining a primary heat exchange surface, said cell being substantially completely sealed and including an inlet header and an outlet header, the only openings into said cell being a port leading a fluid medium intended to be placed in indirect heat exchange with another fluid medium through said cell and into said inlet header and out of said outlet header and discharged therefrom from another port in fluid communication with said outlet header, a portion of said first upper wall and said second lower wall is corrugated and said corrugation of said first upper wall and said second lower wall are contiguous and being intermediate said inlet header and said outlet header.

2. A heal exchanger as claimed in claim 1 including a plurality of cells mounted side by side and adjacent cells defining a pass-through passage, means for conducting the said another fluid medium through said pass-through passage.

3. A heat exchanger as claimed in claim 2 wherein each cell of said plurality of cells are configured in an involute for being mounted in an annular space, wherein said fluid medium in said cell is compressor discharge air from said microturbine engine and said another fluid medium is turbine discharge fluid discharging from the microturbine engine.

4. A heat exchanger having an a first inner plate-like member defining a primary heat transfer surface and a second an inner plate-like member also defining a primary heat transfer surface being spaced relative to each other and contiguous, said second inner plate-like member and said first outer plate-like member having opposing side edges and opposing end edges, said opposing side edges and said opposing end edges and being sealed to define an enclosed cell, said second inner plate-like member and said first outer plate-like member having a sinusoidally shaped surface intermediate the opposing end edges and said second inner plate-like member and said first outer plate-like member defining an inlet header and an outlet header, a plurality of said cells being placed side by side so that the sinusoidally shaped surface of said second inner plate-like member and the sinusoidally shaped surface of said outer first plate-like member define a pass-through passage whereby fluid admitted into said inlet header from an opening formed therein flows through each of said plurality of the cells and into the outlet header and discharged therefrom through an opening formed in said outlet header is placed in indirect heat exchange with fluid flowing through said pass-through passage.

5. A heat exchanger as claimed in claim 4 wherein said second inner plate-like member and said first outer plate-like member are configured in an involute so that when mounted side by side the plurality of cells define an annular shaped heat exchanger.

6. A recuperator for a microturbine engine, said engine including a compressor, turbine and combustor, and said recuperator including a second an inner plate-like member defining a primary heat transfer surface and an a first inner plate-like member also defining a primary heat transfer surface being spaced relative to each other and contiguous, said second inner plate-like member and said first outer plate-like member having opposing side edges and opposing end edges and being sealed to define an enclosed cell, said second inner plate-like member and said first outer plate-like member having a sinusoidally shaped surface intermediate the opposing end edges and said second inner plate-like member and said first outer plate-like member defining an inlet header and an outlet header, a plurality of said cells being placed side by side so that the sinusoidally shaped surface of said inner plate-like member and the sinusoidally shaped surface of said first outer plate-like member define a pass-through passage whereby fluid admitted into said inlet header from an opening formed therein flows through each of said the cells and into the outlet header and discharged therefrom through an opening formed in said outlet header is placed in indirect heat exchange with fluid flowing through said pass-through passage.

7. A recuperator for a microturbine engine as claimed in claim 6 wherein said second inner plate-like member and said first outer plate-like member are configured in an involute so that when mounted side by side the plurality of cells define an annular shaped heat exchanger, means for flowing air discharging from said compressor into said cells and for flowing engine working medium discharging from said turbine between each of said plurality of cells far placing said air and said engine working medium in indirect beat exchange, and additional fluid connection means for flowing air discharging from said cells into said combustor.

8. A recuperator for a microturbine engine, said engine including a compressor, turbine and combustor, and said recuperator comprising a cell including a first an upper wall defining a primary heat exchange surface and a second lower wall underlying and contiguous to said first upper wall defining a primary heat exchange surface, said cell being substanctially completely sealed and including an inlet header and an outlet header, the only openings in said cell being a port leading a fluid medium intended to be placed in indirect heat exchange with another fluid medium through said cell and into said inlet header and out of said outlet header and discharged therefrom from another port in fluid communication with said outlet header, a portion of said first upper wall and said second lower wall is corrugated and said corrugation of said first upper wall and said second lower wall are contiguous and being intermediate said inlet header and said outlet header.

9. A recuperator for a microturbine engine as claimed in claim 8 including a plurality of cells mounted side by side and adjacent cells defining a pass-through passage, means for conducting the said another fluid medium through said pass-through passage.

10. A recuperator for a microturbine engine as claimed in claim 9 wherein each cell of said plurality of cells are configured in an involute for being mounted in an annular space, wherein the discharge from each cell of said plurality is in fluid communication with said combustor and said fluid medium in said cell is compressor discharge air from said compressor and said another fluid medium is turbine discharge fluid discharging from said turbine.

* * * * *